United States Patent
Leshner et al.

(10) Patent No.: US 6,931,120 B1
(45) Date of Patent: Aug. 16, 2005

(54) TELEPHONE-COMPUTER INTERFACE

(75) Inventors: Michael D. Leshner, Columbia, MD (US); Howard P. Leshner, Marlton, NJ (US)

(73) Assignee: MHL Communications, Inc., Columbia, MD (US)

( * ) Notice: Subject to any disclaimer, the term of this patent is extended or adjusted under 35 U.S.C. 154(b) by 796 days.

(21) Appl. No.: 09/783,288

(22) Filed: Feb. 15, 2001

(51) Int. Cl.$^7$ .......................... H04M 1/00; H04M 9/00
(52) U.S. Cl. ................................................. 379/390.04
(58) Field of Search .................. 379/390.04, 392, 379/392.01, 402, 405; 375/285, 296

(56) References Cited

U.S. PATENT DOCUMENTS 6,249,576 B1 * 6/2001 Sassin et al. .......... 379/218.01
6,728,546 B1 * 4/2004 Peterson et al. ............ 455/462

* cited by examiner

Primary Examiner—Curtis Kuntz
Assistant Examiner—Alexander Jamal
(74) Attorney, Agent, or Firm—Browdy and Neimark, P.L.L.C.

(57) ABSTRACT

An electronic circuit for connecting a standard analog telephone to the analog microphone and loudspeaker connections on a personal computer and for separating the talk signal from the combined talk/listen signal occurring at the telephone, effectively minimizing undesirable echo.

6 Claims, 2 Drawing Sheets

TELEPHONE-COMPUTER INTERFACE

BACKGROUND OF THE INVENTION

The present invention relates to an interface for coupling a standard telephone to a computer for internet telephony.

Based on the increasing use of personal computers (PC's) and the internet, a new communications medium is in use. Known as Internet Telephony, Computer Telephony or VOIP (voice over internet protocol), it allows users to communicate with one another using standard personal computers connected to the internet through Internet Service Providers. The communication can include voice (audio), data and video. Voice communication over the internet can be achieved computer-to-computer, computer-to-phone, or phone-to-phone.

To facilitate this new form of communication, new services and software products such as Net2phone™, Netmeeting™, Dialpad™ and many others are now available. When a call is placed from and/or received by a personal computer, the voice signal normally travels via the computer's sound card or equivalent.

The most common user interface available for PC voice communication is a microphone and loudspeakers, which usually connect to the sound card or equivalent in a personal computer. A user talks into the microphone, and listens through the loudspeakers.

Because the microphone senses both the voice of the user and the sound coming from the speakers, and because the internet connection usually introduces some finite delay in transmission, a user may hear the echo of his own voice. To mitigate this annoyance, some users make use of a headset instead of loudspeakers and microphone. The headset connects to the PC sound card in place of the microphone and speakers. Use of a headset does not prevent the headset user from hearing his own echo, but it reduces the echo for the other user. If both users in a connection use headsets, echo is reduced for both.

While the use of headsets ran reduce echo, they may not be the communications devices of choice for many people. For those PC users who would like to use a standard telephone, including a cordless phone, there is no existing simple and inexpensive interface device allowing interconnection between a telephone and a personal computer sound card while satisfactorily eliminating echo. For those users who prefer to use a headset, the use of this invention with a cordless telephone allows a standard headset to be used as a cordless headset.

Two products have been recently introduced to the market for the purpose of connecting a standard telephone to a PC under the tradenames Internet Phonejack™ and Hi-Phone™. Both of these products connect to a standard analog telephone, but do not provide an analog output to the PC. Both products digitize the telephone signal before passing it to the PC. The Internet Phonejack™ is a plug-in card that is installed into the PC data bus. The data bus is strictly digital, and has no provision for the connection of an analog signal. The Hi-Phone™ is external to the PC, but communicates with it via a digital serial port connection.

Both of these products have analog-to digital and digital-to-analog signal processing functions between the telephone and PC. Because both of these products communicate with the PC in digital formats, both require the installation of additional software drivers in the PC.

BRIEF SUMMARY OF THE INVENTION

An object of the present invention is to provide a simple and inexpensive interface that allows users to make use of a standard telephone when placing or receiving telephone calls over the internet using a personal computer.

The invention achieves the above and other objects by the provision of an interface that includes means for separating the talk signal from the combined talk/listen signal occurring at the telephone, effectively minimizing undesirable echo.

In further accordance with the invention, the interface operates completely on analog signals.

In order to allow the normal use of the PC's microphone and speakers when the telephone is not being used, a switching function is provided. The switching function automatically disconnects the microphone and speakers whenever the telephone is off-hook, and restores the microphone and speakers to their normal connection whenever the telephone is on-hook. Lamps are also provided for indicating activity in the talk and listen sections of the telephone circuit.

While the concept of echo reduction and/or cancellation is not new, the instant invention is unique because it reduces the echo at its source. Other echo reduction/cancellation techniques address the echo after it leaves the source, necessitating far more complex and expensive strategies. Most rely of the synthesis of a "pseudo echo" which is then subtracted from the actual echo.

This invention permits a standard analog telephone to be connected directly to the analog microphone and loudspeaker jacks on a personal computer. It permits a user to plug any standard telephone into the interface, connect the interface to a personal computer by plugging connectors of the interface into the speaker and microphone inputs of and sound card, and use the telephone as he would the microphone and loudspeakers usually attached to his personal computer.

DETAILED DESCRIPTION OF THE INVENTION

A standard telephone combines a microphone and earphone connected in series. Because the standard telephone connection uses only two wires, the electrical signal at the voice signal connection is a composite of both the microphone (talk) and earphone (listen) signals. If connected directly to the "mic" and "spk" jacks on a standard PC sound card, this mixing of signals leads to undesirable feedback and echo for the other user. This invention incorporates electronic circuitry to eliminate the feedback and reduce the echo by separating the microphone and earphone signals into two separate and distinct circuits, resulting in improved sound characteristics.

Figure 1:
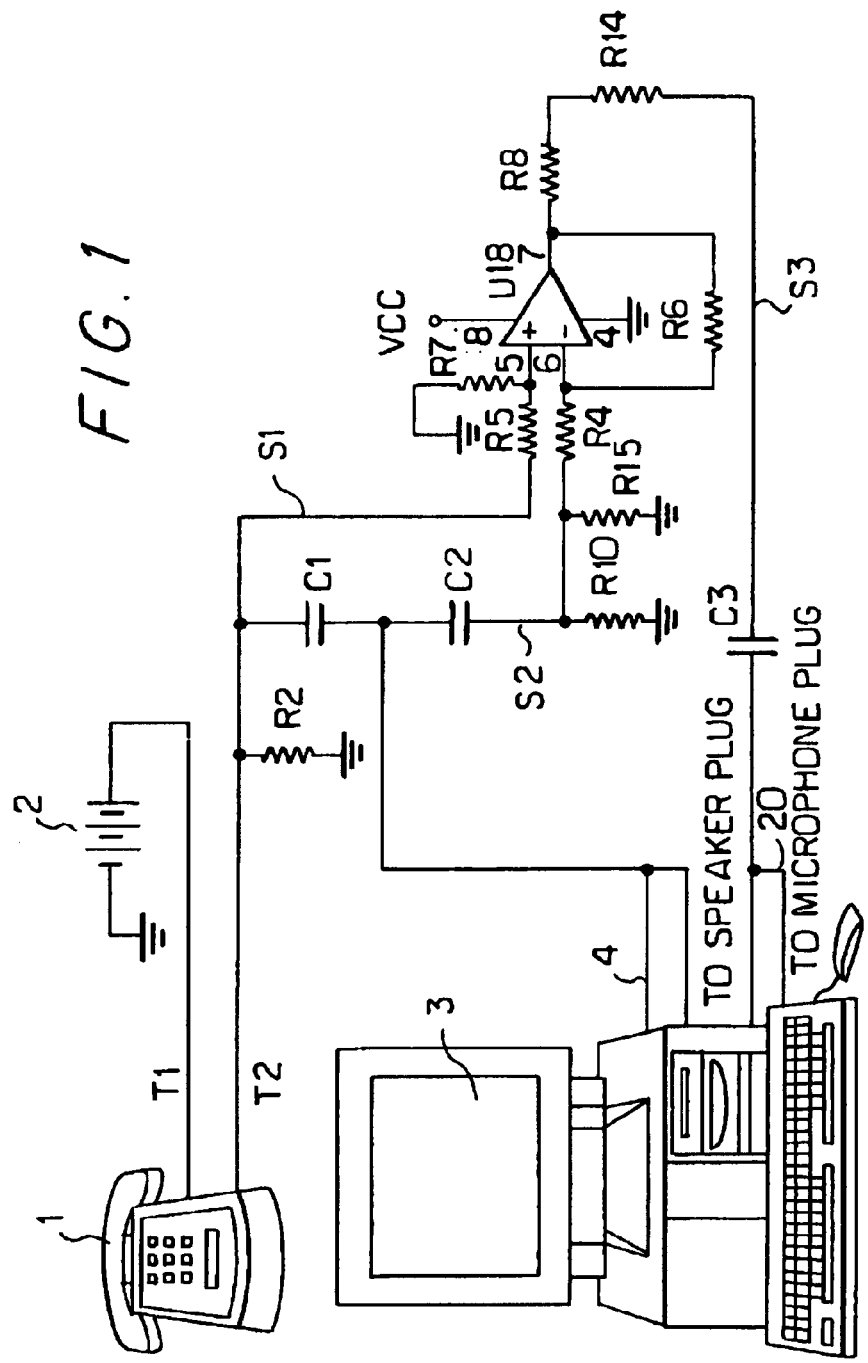
FIG. 1 is a schematic diagram of one preferred embodiment of the telephone-to-computer coupling circuit of an interface according to the invention.

FIG. 1 is a schematic diagram of one preferred embodiment of the telephone-to-computer coupling circuit of an interface according to the invention. This circuit couples a standard telephone 1 to the sound card or other voice signal interface, of a computer 3.

Standard telephone 1 has two connection lines, T1 and T2. Line T1 is connected to the positive side of a Direct Current (DC) power source 2, which provides a voltage in the range of 6 to 12 volts, D.C. The negative side of power source 2 is connected to electrical ground.

A resistor R2 is connected between line T2 and ground. The signal on line T2 contains both the "talk" and "listen" components of the telephone audio signal. Line T2 is also connected to a capacitor C1 and a resistor R5. The other side of capacitor C1 is connected to the speaker output 4 of the sound card personal computer 3. Speaker output 4 has left and right channels which are connected together, as shown.

Audio signals appearing at speaker output 4 are conducted through capacitor C1 and are delivered to line T2 of telephone 1. Capacitor C1 decouples any D.C. component of speaker output 4 and allows only the Alternating Current (A.C.) component of the signal to pass through.

Resistor R5 is connected between line 12 and a terminal 5, the non-inverting input, of a differential, or operational, amplifier (op-amp) U1B. A resistor R7 is connected on one side to terminal 5 of op-amp U1B, and the other side of resistor R7 is connected to ground. Resistor R7 reduces the amplitude of the signal at terminal 5 of U1B.

Speaker output 4 is also connected to a capacitor C2. The other side of capacitor C2 is connected to one side of a resistor R4, and the other side of resistor R4 connected to a terminal 6, the inverting input, of op-amp U1B.

Resistors R10 and R15 are connected to capacitor C2 and resistor R4 on one side and to ground on the other side, reducing the amplitude of the signal passing to the inverting input of op-amp U1B. Resistor R15 and trimming resistor R10 scale the amplitude of this signal. The resistance values of resistors R10 and R15 are chosen to assure that the amplitudes of the signals applied to the inverting and non-inverting op-amp inputs are properly matched, ie., have substantially equal magnitudes in both AC amplitude and DC offset.

A feedback resistor R6 is connected between input terminal 6 and output terminal 7 of op-amp U1B in the usual way for configuring amplifiers. Resistors R8 and R14 carry the output signal from output terminal 7 of op-amp U1B to capacitor C3. Capacitor C3 de-couples the D.C. component from the signal before it is passed to computer 3.

The other side of capacitor C3 is connected to microphone input 20 of the sound card of personal computer 3. The left and right audio channels of the microphone signal are connected together, as shown.

A further description of the signals at S1, S2 and S3 will help to clarify the operation of the on-amp. Signal S1 is the same signal appearing at telephone line T2. This signal is a composite of the "talk" and "listen" portions of the telephone signal. Signal S2 is the A.C. component of the "listen" signal and is applied with the same amplitude to both inputs 5 and 6 of op-amp U1B. Therefore, signal S2 does not contribute to the op-amp output signal. Op-amp U1B subtracts the "listen" signal S2 from the "talk+listen" signal S1, so that signal S3 is a pure "talk" signal. In this way, the "talk" and "listen" signals, although superimposed at the telephone, are separated from one another at personal computer 3.

Connected in this way, the mouthpiece of telephone 1 is substituted for the PC microphone and the telephone earpiece is substituted for the PC speaker.

The following table lists one exemplary and nonlimiting set of component values which have been employed in a practical embodiment of the invention which was found to operate in the desired manner.

| Component Value | Units |
| --- | --- |
| R2 | 1K ohms |
| R4 | 100K ohms |
| R5 | 100K ohms |
| R6 | 100K ohms |
| R7 | 100K ohms |
| R8 | 20K ohms |
| R10 | 1K ohms |
| R14 | 100 ohms |
| R15 | 220 ohms |
| C1 | 0.1 mfd. |
| C2 | 0.1 mfd. |
| C3 | 1 mfd. |
| U1B | LM358 op-amp |

Figure 2:
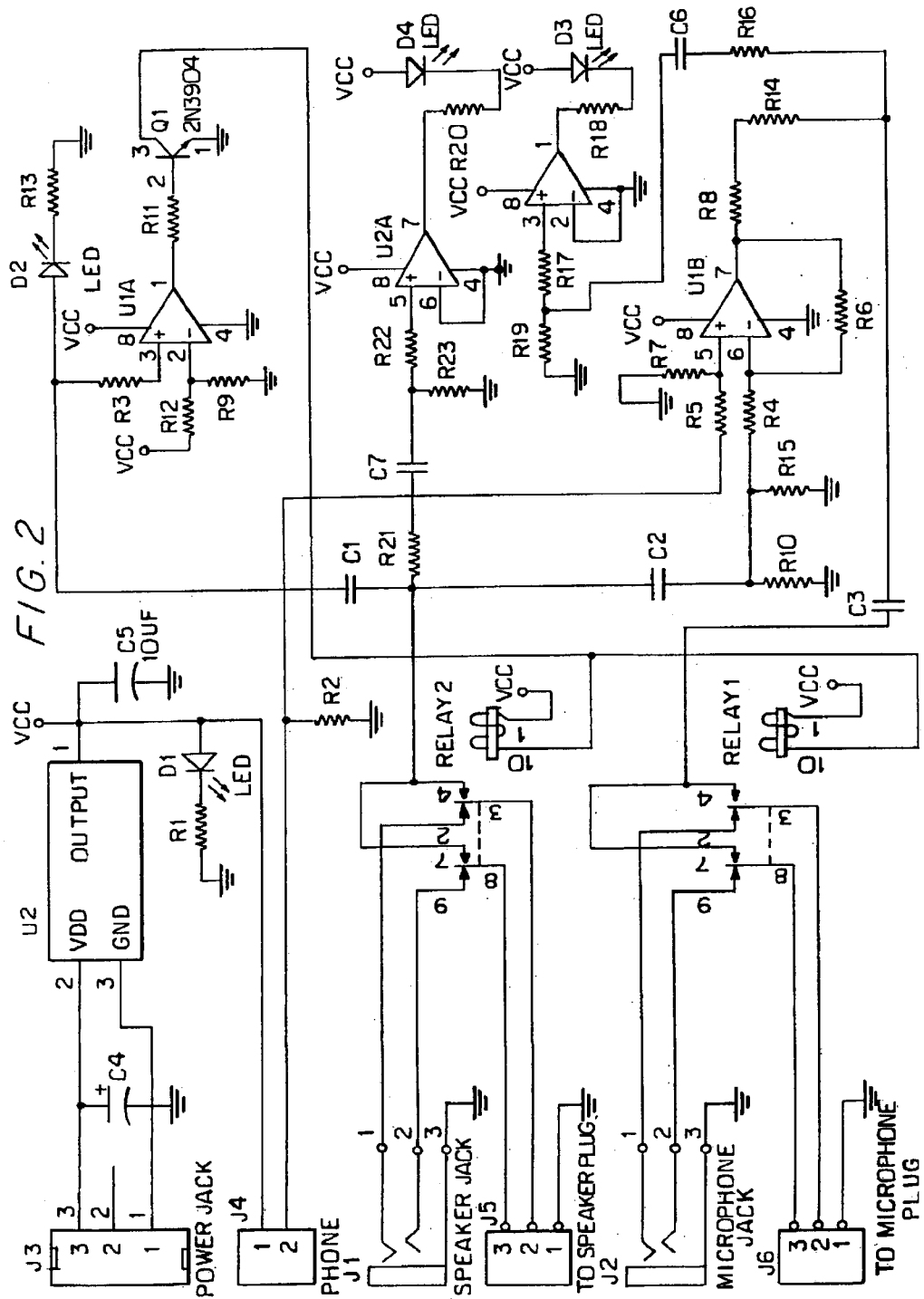
FIG. 2 is a schematic diagram of a complete interface according to the invention containing the circuit of FIG. 1.

FIG. 2 shows one example of a complete interface according to the invention with mic and speaker switching, a regulated power supply and "talk" and "listen" indicators.

In this circuit, a regulated power supply is provided in place of a battery. Relay 1 is provided for the purpose of switching the PC microphone input between the microphone and telephone circuits.

The interface includes six connectors J1–J6, for connecting the interface to a computer and a standard telephone, which may be a cordless phone. Connector J1 is a speaker jack to which the plug of a computer speaker system will be connected. Connector J2 is a microphone jack to which the plug of a computer microphone will be connected. Connector J3 is a power supply jack, or plug, which will be connected to an electric power supply, such as a conventional household wall receptacle transformer. Connector J4 is a standard phone jack which will be connected the standard telephone receptacle in place of a connector which would normally connect the telephone to the local telephone system. Connector J5 is a speaker plug that will be plugged into the speaker output of the computer'sound card. Connector J6 is a microphone plug that will be plugged into the microphone input of the computer sound card.

When the relay coil is not energized, the microphone is connected directly to the PC microphone input. When the relay coil is energized, the left and right channels of the PC microphone input are shorted together, and connected to the output of U1B.

Similarly, Relay 2 is provided for the purpose of switching the PC speaker output between the speaker and telephone circuits. When the relay coil is not energized, the speaker is connected directly to the PC speaker output When the relay coil is energized, the left and right channels of the PC speaker output are shorted together, and connected through capacitors C1 and C2 to telephone 1 and U1B, respectively.

When telephone 1 is off-hook, current flows through the telephone and a DC voltage is present across resistor R2. This voltage is passed along to a second op-amp U1A, which is another op-amp used as a voltage comparator.

A voltage divider consisting of resistors R9 and R12 creates a fixed reference voltage at the inverting input of U1A. Whenever the phone is off-hook, the DC voltage at the non-inverting input of U1A is greater than the reference voltage, and the output of U1A goes positive, causing a transistor Q1 to allow current to flow, powering the coils of relays 1 and 2. Thus, when the phone is off-hook, relays 1 and 2 switch off the microphone and speakers and connect the telephone to the PC. When the phone is placed on-hook, it is disconnected from the PC and the microphone and speakers operate normally.

The non-inverting input of a further op-amp U2A of a talk signal indicating unit is connected to receive talk signals at the output of U1B. The inverting input of U2A is grounded. U2A is an op-amp used as a voltage comparator. Whenever the talk signal is above zero volts, a light emitting diode (LED) D3 is illuminated, to give an indication of talk activity to the user.

Similarly, the PC speaker output is passed to the non-inverting input of another op-amp U2B in a listen signal indicating unit, causing a LED D4 to illuminate whenever the listen signal is above zero volts.

In an interface according to the invention, component values are chosen to provide compatibility between signal levels in the computer, microphone, speakers and telephone. Capacitors are used in the conventional way to isolate a signal's DC level from its AC component.

It will be apparent to those skilled in the art that transistor networks or other solid state components may be substituted for relays 1 and 2. Similarly, alternative electronic circuits may be used to perform the functions of op-amps U1A, U1B, U2A and U2B.

Power may be supplied to the interface and the telephone from a sound card game-port, USB port, or other source on the PC. In addition, switching between the connection of the sound card to the interface and directly to a microphone and speaker system may be performed by a manual switch instead of relays. The circuitry of an interface according to the invention may be incorporated into a PC sound card, USB audio device or a telephone.

The instant invention does not need to synthesize any signal that is not already present in the telephone or PC. It does not require digital signal processing, delay lines, monitoring of echo, or dynamic adjustment techniques typical of prior art inventions. This invention does not require any hardware to be installed into the computer, and does not require any additional software to be installed into the PC. Because there is no digitization of signals in this invention, it can be implemented using simple and inexpensive electronics.

Although the instant invention does not require any special software to be installed into the PC, there are some specific situations where it may be desirable to use the invention in conjunction with complementary software.

One form of such complementary software could be configured to recognize the dialing (DTMF) tones generated by a standard telephone, and interpret those DTMF tones in such a way that the PC places a call to the number dialed. Examples of such software are marketed by GlimaDyne under the designation WINDTMF™ and by RA Solutions, Inc. under the designation WINTONE 2.0™.

Another complementary software application could generate voice messages to be played through the telephone for the purpose of commercial advertising, or for providing instructions to the user. One example of such software is available from Nullsoft under the designation Winamp™.

While the description above refers to particular embodiments of the present invention, it will be understood that many modifications may be made without departing from the spirit thereof the accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An interface for coupling a telephone having an audio signal line to voice signal input and output devices of a computer to enable use of the telephone in internet telephony, comprising:

an echo-suppressing electronic component arranged to be connected to the audio signal line and the voice signal input and output devices, wherein said component comprises means for coupling the audio signal line to the voice signal input and output devices and minimizing signal transmission from the voice signal output device to the voice signal input device, and wherein said component comprises:

a differential amplifier having a noninverting input provided for direct connection to the telephone audio signal line, said amplifier further having an inverting input and an output;

first high pass filter means providing a path for conducting AC signal component from the telephone audio signal line to said inverting input; and circuit means for connecting said output to the voice signal input device of the computer.

2. The interface of claim 1 wherein said component further comprises second high pass filter means providing a path for conducting AC signal components from the voice signal output device of the computer to the telephone audio signal line.

3. The interface of claim 2 wherein said first high pass filter means comprise first and second capacitors connected together in series, with said first capacitor being connectable to the telephone audio signal line and said second capacitor being connected to said inverting input, and wherein said first capacitor constitutes said second high pass filter means.

4. The interface of claim 3 wherein said circuit means are constituted by a DC blocking element.

5. The interface of claim 4 wherein said component further comprises resistance means connected to at least one input of said amplifier for causing the signals from the telephone audio signal line to have equal magnitudes at both inputs.

6. The interface of claim 5 further comprising switch means operable in response to an on-hook condition of the telephone for connecting the voice signal input device of the computer directly to a microphone and for connecting the voice signal output device of the computer directly to a second transducer.

* * * * *